No. 644,999. Patented Mar. 6, 1900.
F. H. NICHOLS.
SWIVEL PLOW.
(Application filed Feb. 24, 1898.)

(No Model.)

Witnesses.
C. W. Meadows.
J. W. Bell.

Inventor.
F. H. Nichols.

THE NORRIS PETERS CO., PHOTO-LITHO., WASHINGTON, D. C.

United States Patent Office.

FRANKLIN H. NICHOLS, OF CHETEK, WISCONSIN, ASSIGNOR OF ONE-HALF TO GEORGE HEWITT, OF SAME PLACE.

SWIVEL-PLOW.

SPECIFICATION forming part of Letters Patent No. 644,999, dated March 6, 1900.

Application filed February 24, 1898. Serial No. 671,544. (No model.)

*To all whom it may concern:*

Be it known that I, FRANKLIN H. NICHOLS, a citizen of the United States, residing at Chetek, in the county of Barron and State of Wisconsin, have invented a new and useful Swivel-Plow, of which the following is a specification.

This invention relates to plows, and has for its object to provide certain new and useful improvements whereby the moldboard and share may be adjusted from one side to the other of the beam, so as to accommodate a single plow for turning furrows to the right and to the left without entirely removing the plow from the beam, and also to provide means for locking and bracing the plow in its adjusted positions, so as to prevent accidental movement thereof upon the beam and to facilitate the movement of the plow from one position to the other. It is also designed to provide means for adjusting the direction of the draft upon the plow and to arrange such means for convenient operation from the handle end of the beam, so that the operator may change the direction of the draft while the plow is in motion and without moving away from the plow-handles.

To these ends the present invention consists in the combination and arrangement of parts, as will be hereinafter more fully described, shown in the accompanying drawings, and particularly pointed out in the appended claims, it being understood that changes in the form, proportion, size, and minor details may be made within the scope of the appended claims without departing from the spirit or sacrificing any of the advantages of the invention.

Figure 1:
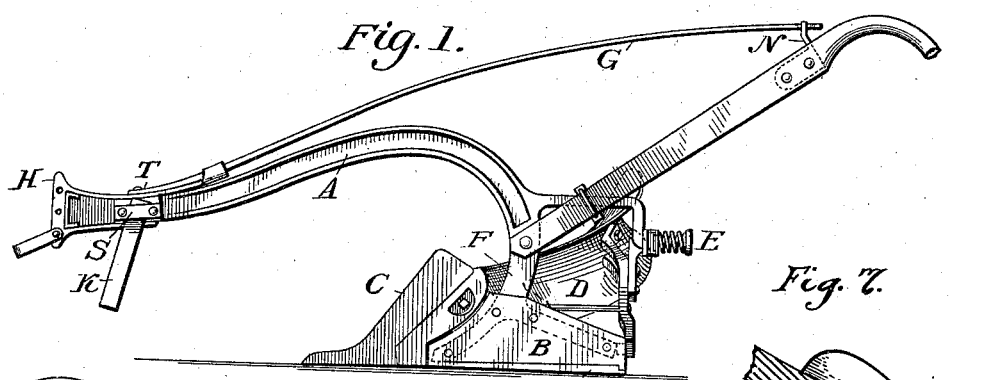
Figure 7:
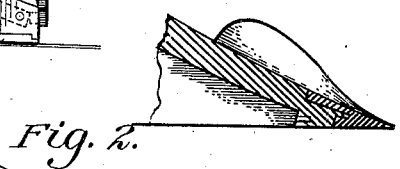
Figures 2, 6:
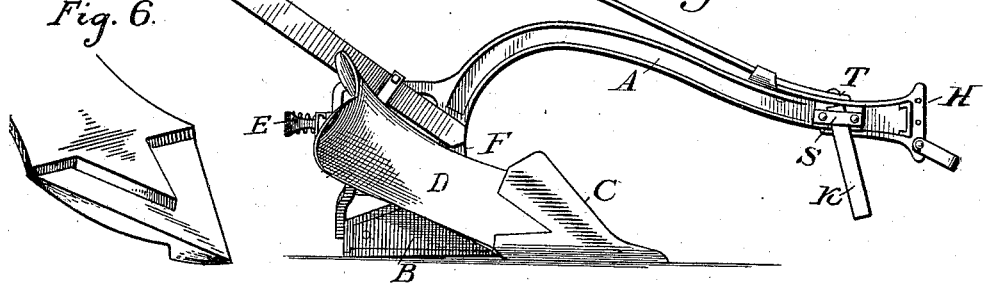
Figure 3:
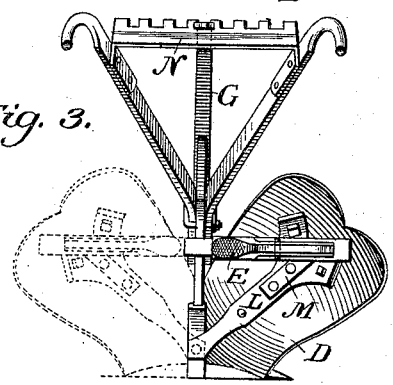
Figure 4:
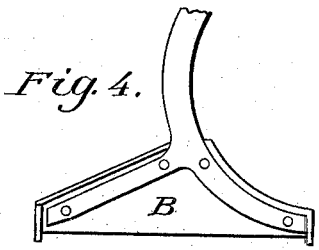
Figure 5:
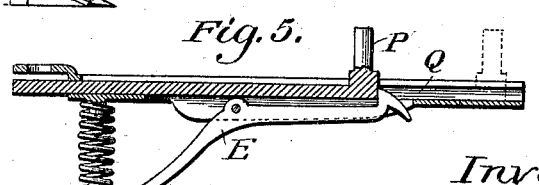

In the drawings, Figure 1 is an elevation of the landside of a plow constructed in accordance with the present invention. Fig. 2 is an elevation of the moldboard side of the plow. Fig. 3 is a rear view illustrating the opposite positions of the plow. Fig. 4 is a detail elevation of the foot end of the plow-beam. Fig. 5 is a detail horizontal sectional view taken through the device for locking the moldboard. Fig. 6 is a detail perspective view of the forward end of the moldboard, the share being removed. Fig. 7 is a detail longitudinal sectional view taken centrally through the share and the forward end of the moldboard.

Corresponding parts in the several figures of the drawings are designated by like characters of reference.

Referring to the accompanying drawings, A designates the plow-beam, which has a high arch at its rear end, and the latter is also provided with the front and rear branch members 1 and 2, of which the front member 1 forms a continuation of the arch. The landside is formed by opposite plates B and B', of which the plate B is provided with the laterally-projecting front and rear flanges 3 and 4, respectively. The opposite portions of the upper edge of the plate B converge inwardly and upwardly from opposite ends of the plate, and each of these inclined portions is provided with a longitudinal flange 5, which projects laterally in the same direction as the end flanges 3 and 4. The opposite plate B' is of the same shape as the former plate and fits snugly between the flanges of the latter, so as to form a box, receiving the branches of the beam, to which the plates are secured by suitable fastenings 6. It will be noted that the end flanges 3 and 4 project below the plates, so that the heel-plate J may be fitted between and secured thereto.

By reference to Figs. 6 and 7 it will be seen that the moldboard D is concaved from front to rear and convexed laterally, as is usual. The forward end of the moldboard is cut away or recessed at opposite sides, so as to provide a forwardly-projecting and inverted-V-shaped tongue 7. Upon the under side of the moldboard and extending longitudinally at the opposite edges of the cut-away portion thereof are the flanges 8, which are of segmental shape. The forward ends of these flanges merge into an enlargement or shoulder 9, located upon the under side and at the forward extremity of the moldboard, and the opposite longitudinal sides of the shoulder are disposed at right angles to each other.

The plowshare C is of double formation and provided at its rear end with a substantially V-shaped notch or socket 10 for the reception of the tongue 7 on the moldboard and is secured thereto by means of suitable fastenings 11. It will be understood that the share fits upon the recessed or cut-away portion of the moldboard, and its rear end abuts firmly against the opposite shoulders 12, formed by the recessed portion of the moldboard and at opposite sides of the tongue 7. The point of the share is enlarged, so as to form a shoulder 13 upon its under side and abutting firmly against the forward end of the shoulder 9 on the moldboard.

As hereinbefore set forth, it is designed to adjust the moldboard and share from one side to the other of the plow-beam, and to provide for this movement the moldboard is pivoted to the forward end of the landside by means of a forwardly-projecting pivot-pin 14, provided upon the landside and pivotally received within a socket 15, formed in the rear side of the shoulder 9 at the forward end of the moldboard. The rear end of the moldboard is pivotally connected to the rear end of the landside by means of an arm L, which is provided at its outer end with divergent members 16, secured to the inner or rear side of the moldboard. The opposite end of this arm is provided with a pivot-pin 17, received within a socket 18, formed in the rear end of the landside.

From the foregoing description it will be apparent that the moldboard is pivoted to the opposite ends of the landside, so as to swing laterally beneath the latter and to opposite sides thereof, as indicated by the full and dotted lines in Fig. 3 of the drawings. The arm L is braced by means of a rod 20, having one end connected to an intermediate portion of the arm and its opposite end secured to the under side of the moldboard near the forward end thereof.

To lock the moldboard in either of its adjusted positions, there is provided means comprising a substantially L-shaped arm 21, extending rearwardly from the arched portion of the beam, the rear angled end of this arm being located approximately over the rear end of the landside and extending downwardly. Pivoted to the rear end of the arm 21 is a sheath 22, which is provided at its inner end with an offset perforated ear 23, which forms the pivotal connection with the supporting-arm 21. Upon the inner side of the sheath and extending longitudinally of each edge thereof is a flange 24, and slidably received between the opposite flanges is an arm 25. Secured to the pivoted arm L is a bracket M, which is designed to pivotally support a pivot-pin P, projecting from the outer end of the slidable arm 25. It will be understood that the pivot-pin P projects at the front side of the slide, so as to be received between the flanges 24 during the movement of the slide. A longitudinal slot 26 is formed in the sheath, and the opposite longitudinal edges of the slot are provided with rearwardly-extending flanges 27. Mounted within this slot and pivoted intermediate of its ends to the opposite flanges 27, as indicated at 28, is a latch E, having its outer free end provided with a catch-head 29, extending forwardly through the slot 26 and designed to engage against the outer end of the slide 25. Interposed between the opposite end or thumb portion of the latch and the sheath is a coiled spring 30, normally holding the catch-head 29 within the slot in the sheath.

The moldboard being at either side of the plow-beam and it being desired to adjust the same to the opposite side of the beam, the latch E is operated to disengage the catch-head 29 from the outer end of the slide 25, whereby the moldboard is free to be swung laterally to the opposite side of the beam and upon its pivotal axis. This movement is permitted by reason of the sheath being pivotally connected to the supporting-arm 21 and the slide 25 having a pivotal connection with the moldboard, so that said members may swing laterally with the moldboard and the slide may move longitudinally of the sheath.

The plow-handles 31 are of common or ordinary form, having their forward ends embracing the arched portion of the beam and secured thereto in any preferred manner. The handles also embrace the horizontal portion of the arm 21 and are secured to the latter by means of a substantially U-shaped clamp 32.

Mounted at the forward end of the plow-beam is a clevis H, having the upper and lower rearwardly-extending arms 33 and 34, respectively, which loosely embrace the plow-beam and are pivoted thereto by means of a suitable pivot-pin T. The upper arm 33 extends a suitable distance in rear of the pivot-pin and each opposite side is provided with an ear 35. It will thus be apparent that the clevis has a lateral movement upon the pivot-pin P, and to conveniently adjust the clevis there is provided an operating-lever G, having its forward end pivoted to the pin P and snugly embraced by the ears 35. The rear end of this lever extends to a point adjacent to the rear ends of the plow-handles, so as to be in convenient reach of the operator. Located between the plow-handles and secured to the inner sides thereof is a transverse rack N, having the teeth located upon its upper edge and with which the rear end of the lever G adjustably engages. By moving the rear end of the lever G in either direction the clevis is adjusted laterally in an opposite direction, so as to change the direction of the draft. It is preferable to provide the opposite edges of the lever with suitable notches for engagement with the teeth of the rack, so as to prevent accidental displacement of the rear end of the lever.

Pendent from each side and at the forward end of the plow-beam is a standard K, which is adjustable vertically upon the beam by means of a clamp-plate S, which embraces the standard and is provided at opposite ends with suitable fastenings entering the plow-beam. The purpose of these standards is to support a suitable wheel or roller for traveling in advance of the plow and supporting the forward end of the plow-beam.

What I claim is—

1. The combination with a plow-beam, of a landside carried thereby, a moldboard having a share, and pivoted to the landside, a telescopic connection between the plow-beam and the moldboard, the outer ends of the telescopic members being pivotally connected to the beam and the moldboard, respectively, and a locking device carried by one of the members and having a locking engagement with the other member, in the opposite adjusted positions of the moldboard.

2. The combination with a plow-beam, of a landside carried thereby, a moldboard having a share and pivoted to the landside, a sheath having one end pivoted to the plow-beam, a slide mounted upon the sheath and having one end pivoted to the moldboard, and a latch carried by the sheath, and having a locking engagement with the slide in the opposite adjusted positions of the moldboard.

3. The combination with a plow-beam, of a landside carried thereby, a moldboard having a share and pivoted to the landside, a longitudinally-slotted sheath, having one end pivoted to the plow-beam, a slide mounted within the sheath and provided with a lateral pivot-pin projecting transversely through the slot in the sheath, and pivotally connected to the moldboard, and means for locking the slide and the sheath against movement.

4. The combination with a plow-beam, of a landside carried thereby, a moldboard having a share and pivoted to the landside, a sheath provided with a longitudinal slot, and having its inner end pivoted to the plow-beam, a latch pivoted to the sheath and projecting through the slot and into the interior of the sheath, and a slide mounted within the sheath and having its outer end pivotally connected to the moldboard, the latch having a lateral engagement with the slide, in the opposite adjusted positions of the moldboard.

5. The combination with a plow-beam, of a landside carried thereby, a moldboard having a share and pivoted to the landside, a sheath having its inner end pivoted to the plow-beam, a slide mounted within the sheath and having its outer end pivotally connected to the moldboard, and a latch carried by the sheath, and having a locking engagement with the outer extremity of the slide, in the opposite adjusted positions of the moldboard.

6. The combination with a plow-beam, of a landside carried thereby, a moldboard having a share, and pivoted to the landside, a sheath having its inner end pivoted to the plow-beam, and also provided with a longitudinal slot, a latch pivoted to the sheath, and having a head normally projecting inwardly through the slot, and a slide mounted within the sheath, and having its outer end pivotally connected to the moldboard, the outer end of the slide being located within the sheath in the opposite adjusted positions of the moldboard, and the head of the latch fitting against said outer end of the slide.

7. The combination with a plow-beam, having an arm extending rearwardly therefrom, of a landside carried by the beam and located below the arm, a moldboard pivoted to the landside, a locking and bracing device having its opposite ends pivoted respectively to the moldboard and the rearwardly-extending arm, and a pair of handles secured to the beam, extending rearwardly therefrom and embracing the arms, and a fastening device securing the handles to the arms.

8. The combination with a plow-beam, having its rear end provided with front and rear branch members, of a landside comprising opposite plates embracing the branch members, one of the plates having upper and end flanges, the other plate fitting snugly between the flanges, fastenings passing through the plates and the respective branches, the end flanges projecting beyond the plates, and a heel-plate fitted between said end flanges.

FRANKLIN H. NICHOLS.

Witnesses:
C. W. MEADOWS,
WALTER SPEED.